Jan. 10, 1950     G. E. CUTTAT     2,493,738
TWO-SPEED DRIVE FOR LATHE CAM SHAFTS
Filed Dec. 28, 1946
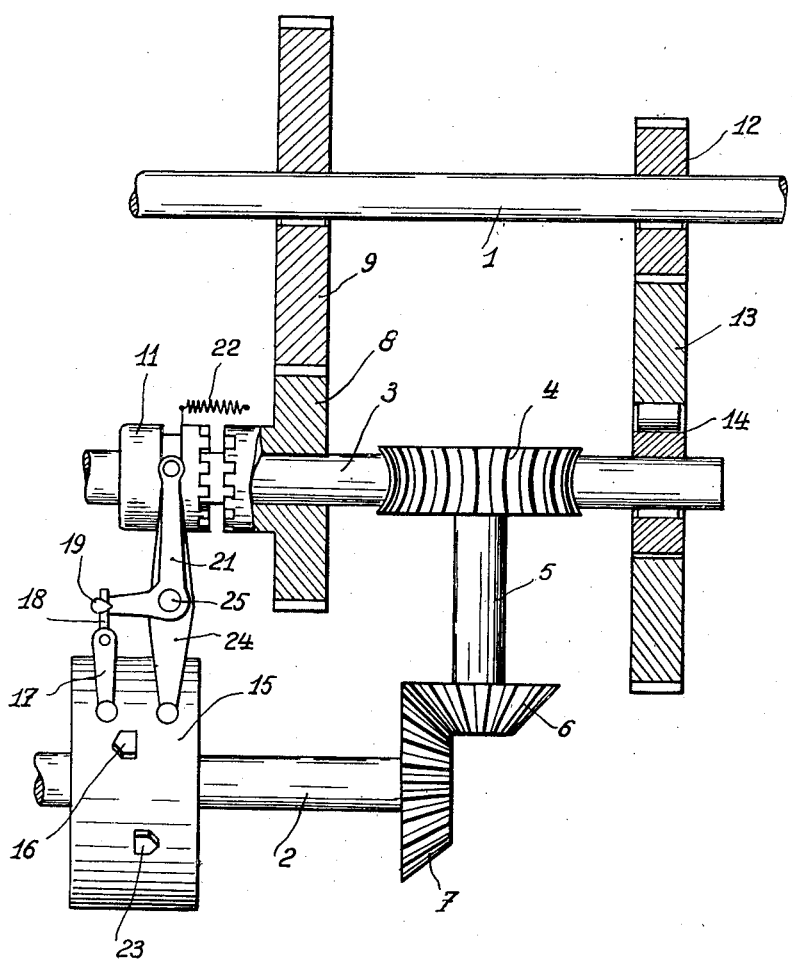
INVENTOR
Georges Emile Cuttat
By Robert E. Burns
ATTORNEY Patented Jan. 10, 1950

2,493,738

UNITED STATES PATENT OFFICE 2,493,738

TWO-SPEED DRIVE FOR LATHE CAMSHAFTS

Georges Emile Cuttat, Geneva, Switzerland, assignor to Manufacture De Machines Du Haut-Rhin, Haut-Rhin, France, a company of France Application December 28, 1946, Serial No. 719,090
In France November 7, 1944

Section 1, Public Law 690, August 8, 1946
Patent expires November 7, 1964

1 Claim. (Cl. 74—368)

In one-spindled automatic lathes with an auxiliary shaft the auxiliary shaft, rotating at a constant speed, transmits its motion to the main cam shaft through an endless screw shaft, and said cam shaft, by the action of the cams it carries, determines the various operations constituting the work cycle of the lathe.

But, while certain of these operations must be carried out slowly, others, constituting non productive times (motions of empty carriages, tool changes, etc.), must be effected as rapidly as possible.

Devices have, therefore, been designed, by means of which, starting from the constant velocity of the auxiliary shaft, an accelerated movement can be imparted to the main shaft, while it is possible to return to the slower velocity without any discontinuity and without stopping the organs causing the slow drive.

The present invention concerns a device of this type, offering the advantages of considerable simplicity and flexibility of operation. In this device, the endless screw shaft receives from the auxiliary shaft, alternately, a rapid and a slow speed, the latter being dependent on a free wheel drive, the transition from one to other speed being effected by a coupling organ controlled by the main shaft, and the characteristic feature of the device, according to the present invention, consists in that this coupling organ is placed on the endless screw shaft itself.

One type of embodiment of a device according to the present invention will now be described hereinafter and is represented, hereinafter, by way of example, in the appended drawing.

I designates the auxiliary shaft rotating at a constant speed; 2 is the main cam shaft of the lathe and 3 the endless screw shaft; the endless screw of said shaft engages a worm wheel 4 keyed on shaft end 5, provided with a conical pinion 6 meshed with another conical pinion 7, keyed on main shaft 2. On shaft 3, a gear 8 rotates freely, driven at a high speed by gear 9 keyed on shaft 1. Gear 8 can be put in gear with a coupling sheath 11, capable of sliding without turning on shaft 3.

On shaft I is also keyed a cog-wheel 12, driving, at low speed a cog-wheel 13, driving, in turn, through a conventional free wheel drive 14, endless screw shaft 3 in such a way that said shaft can be driven by gear train 9, 8 at a speed greater than that imparted to it normally by gear 13. Such free wheel drives are well known in the art.

The passage from low speed to accelerated speed is effected by means of the following organs:

On main shaft 2, a drum 15 is locked, carrying a catch 16, capable of acting on the end of a lever 17 offering, in the region in which it pivots, an appendage 18, cooperating with a hook 19, mounted on one arm of a bell crank lever 21, the end of whose other arm carries a peg which cooperates with a groove of the coupling sheath, 11.

A spring 22 causes the return motion of the coupling sheath. It is clear that when catch 16 meets lever 17 and pushes it towards the left, appendage 18, coming out of engagement with hook 19 releases lever 21 and sheath 11, drawn by spring 22 engages gear 8. This gear 8 is thus associated with shaft 3 and drives said shaft at an increased speed, determined by gear train 9, 8. The endless screw drives worm-wheel 4 which, through bevel gears 6, 7, causes the rotation of main shaft 2 at an accelerated speed. Drum 15 carries another catch 23, facing in the opposite direction to catch 16 and which acts on one end of a lever 24 pivoted at 25 and articulated by its other end on sheath 11. The teeth of the latter separate from the teeth of gear 8, while, at the same time, hook 19 of bell crank lever 21 re-engages with appendage 18. Thus return is made to the driving of main shaft 2 by gear train 12, 13, i. e., at slow speed.

Obviously, the device according to the present invention, can be combined advantageously with the safety devices described in the U. S. application No. 719,077 filed on December 28, 1946, now abandoned.

Having now particularly described and ascertained the nature of my invention and the manner in which the same is to be performed, I declare that what I claim is:

A device for temporarily obtaining in an automatic lathe with an auxiliary shaft an increased velocity of the main shaft comprising a driving auxiliary shaft rotating at a constant speed, an intermediary shaft carrying an endless screw, gearing adapted to transmit the rotation of said auxiliary driving shaft to said endless screw shaft and to impart a slow speed to the same, said gearing containing a free wheel drive allowing the free rotation of said endless screw shaft at a speed greater than said slow speed, a wheel rotatively mounted on said endless screw shaft, a gear adapted to transmit the rotation of the auxiliary driving shaft to said wheel and to impart a rapid speed to the same, a coupling member slidably but non-rotatively mounted on said endless screw shaft and cooperating with said wheel, a main shaft, gearing adapted to transmit the rotation of said endless screw shaft to the main shaft, elastic means urging the coupling member towards the coupling position, a drum on the main shaft, two catches on said drum, a lever retaining the coupling member in the uncoupling position, a member acted by one of the catches and able to release said retaining lever, another lever for returning the coupling into the uncoupling position, said lever cooperating with the other catch of the drum.

GEORGES EMILE CUTTAT.

REFERENCES CITED

The following references are of record in the file of this patent:

UNITED STATES PATENTS

| Number | Name | Date |
|---|---|---|
| 1,225,487 | Potter | May 8, 1917 |
| 1,363,751 | Potter | Dec. 28, 1920 |
| 1,870,226 | Bishop | Aug. 9, 1932 |
| 1,944,994 | Nepple | Jan. 30, 1934 |
| 2,370,282 | Bagley | Feb. 27, 1945 |

FOREIGN PATENTS

| Number | Country | Date |
|---|---|---|
| 479,125 | Germany | July 18, 1929 |